(12) United States Patent
Tsuji et al.

(10) Patent No.: US 11,498,144 B2
(45) Date of Patent: *Nov. 15, 2022

(54) HORIZONTAL FILLET WELDING METHOD, HORIZONTAL FILLET WELDING SYSTEM, AND PROGRAM

(71) Applicant: Kobe Steel, Ltd., Kobe (JP)

(72) Inventors: Katsuyuki Tsuji, Fujisawa (JP); Masayuki Shigeyoshi, Fujisawa (JP); Atsushi Fukunaga, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 904 days.

This patent is subject to a terminal disclaimer.

(21) Appl. No.: 15/569,093

(22) PCT Filed: Apr. 22, 2016

(86) PCT No.: PCT/JP2016/062849
§ 371 (c)(1),
(2) Date: Oct. 25, 2017

(87) PCT Pub. No.: WO2016/175155
PCT Pub. Date: Nov. 3, 2016

(65) Prior Publication Data
US 2018/0117696 A1 May 3, 2018

(30) Foreign Application Priority Data

Apr. 30, 2015 (JP) .............................. JP2015-093671

(51) Int. Cl.
*B23K 9/02* (2006.01)
*B23K 9/025* (2006.01)
(Continued)

(52) U.S. Cl.
CPC .............. *B23K 9/0216* (2013.01); *B23K 9/02* (2013.01); *B23K 9/025* (2013.01); *B23K 9/0256* (2013.01); *B23K 9/095* (2013.01); *B23K 9/173* (2013.01)

(58) Field of Classification Search
CPC .... B23K 9/0256; B23K 9/0216; B23K 9/025; B23K 9/095
(Continued)

(56) References Cited

U.S. PATENT DOCUMENTS 3,832,522 A * 8/1974 Arikawa .................. B23K 9/09
219/137 R
10,406,620 B2 * 9/2019 Tsuji .................... B23K 9/0953
(Continued)

FOREIGN PATENT DOCUMENTS

| CN | 101745723 A | 6/2010 |
|----|-------------|--------|
| JP | 51-65052    | 6/1976 |

(Continued)

OTHER PUBLICATIONS

Japanese patent publication JPH0890235A with Machine Translation, original patent published Apr. 9, 1996 (Year: 1996).*
(Continued)

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

A welding system that, using a junction at which a standing plate and a bottom plate meet as a welding line, makes an electrode weave centered on the welding line and thereby welds along the welding line. While weaving, the electrode moves forward in a welding advancement direction until a bottom-plate-side weaving edge. When the electrode arrives at the bottom-plate-side weaving edge, the electrode moves (Continued)

backward with respect to the welding advancement direction until a standing-plate-side weaving edge. The electrode repeats this weaving motion on the bottom-plate side and on the standing-plate side. The system can suppress occurrence of inferior bead appearance and of welding defects in horizontal fillet welding.

9 Claims, 17 Drawing Sheets

(51) Int. Cl.
*B23K 9/095* (2006.01)
*B23K 9/173* (2006.01)

(58) Field of Classification Search
USPC .................. 219/125.12, 124.33, 130.5
See application file for complete search history.

(56) References Cited

U.S. PATENT DOCUMENTS

| | | | |
|---|---|---|---|
| 2004/0074885 A1 | 4/2004 | Takatani et al. | |
| 2009/0107969 A1* | 4/2009 | Asai | B23K 9/0953 219/124.1 |

FOREIGN PATENT DOCUMENTS

| | | |
|---|---|---|
| JP | 8-90235 A | 4/1996 |
| JP | 2002-321055 A | 11/2002 |
| JP | 2003-53540 A | 2/2003 |
| JP | 2010-94697 A | 4/2010 |

OTHER PUBLICATIONS

Hobart Institute of Welding Technology, Flux Cored Arc Welding (3rd Edition, 2011) (Year: 2011).*
Japanese patent publication JP201009469A with Machine Translation, original patent published Apr. 30, 2010 (Year: 2010).*
Japanese patent publication JPS51065052A with Machine Translation, original patent published 1976 (Year: 1976).*
Japanese patent publication JP2010094697A with Machine Translation, original patent published Apr. 30, 2010 (Year: 2010).*
Machine translation of Korean patent publication KR20070066061A; Park; 2007 (Year: 2007).*
International Search Report dated Jun. 27, 2016 in PCT/JP2016/062849 filed Apr. 22, 2016.

* cited by examiner

FIG. 10

| PRACTICAL EXAMPLE/ COMPARATIVE EXAMPLE | TEST No. | WELDING CONDITIONS ||||| ARC VOLTAGE $V_{Lower}$ || ARC VOLTAGE $V_{Upper}$ ||
|---|---|---|---|---|---|---|---|---|---|---|
| | | TORCH ANGLE θ (DEGREES) | LEADING AND TRAILING ANGLES (DEGREES) | STANDING-PLATE-SIDE MOVEMENT ANGLE α (DEGREES) | STANDING-PLATE-SIDE MOVEMENT ANGLE β (DEGREES) | ARC VOLTAGE $V_O$ (V) | (V) | (%) | (V) | (%) |
| PRACTICAL EXAMPLE | 1 | 45 | 0 | 6 | 185 | 33.0 | 33 | 100 | 33.0 | 100 |
| PRACTICAL EXAMPLE | 2 | 45 | 0 | 18 | 193 | 33.0 | 33 | 100 | 33.0 | 100 |
| PRACTICAL EXAMPLE | 3 | 45 | 0 | 38 | 205 | 33.0 | 33 | 100 | 33.0 | 100 |
| PRACTICAL EXAMPLE | 4 | 45 | 0 | 82 | 224 | 33.0 | 33 | 100 | 33.0 | 100 |
| PRACTICAL EXAMPLE | 5 | 45 | 0 | 75 | 250 | 33.0 | 33 | 100 | 33.0 | 100 |
| PRACTICAL EXAMPLE | 6 | 45 | 0 | 6 | 185 | 32.5 | 38.3 | 118 | 30.6 | 94 |
| PRACTICAL EXAMPLE | 7 | 45 | 0 | 6 | 185 | 32.5 | 40.3 | 124 | 28.6 | 88 |
| PRACTICAL EXAMPLE | 8 | 45 | 0 | 6 | 185 | 32.5 | 32.5 | 100 | 34.4 | 106 |
| PRACTICAL EXAMPLE | 9 | 45 | 0 | 6 | 185 | 32.5 | 32.5 | 100 | 36.4 | 112 |
| PRACTICAL EXAMPLE | 10 | 45 | 0 | 38 | 205 | 32.5 | 36.4 | 106 | 32.5 | 100 |
| PRACTICAL EXAMPLE | 11 | 45 | 0 | 38 | 205 | 32.5 | 36.4 | 112 | 32.5 | 100 |
| PRACTICAL EXAMPLE | 12 | 45 | 0 | 17 | 193 | 32.5 | 36.4 | 106 | 32.5 | 100 |
| PRACTICAL EXAMPLE | 13 | 45 | 0 | 17 | 193 | 32.5 | 36.4 | 112 | 32.5 | 100 |
| PRACTICAL EXAMPLE | 14 | 45 | 0 | 38 | 205 | 32.5 | 32.5 | 100 | 34.4 | 106 |
| PRACTICAL EXAMPLE | 15 | 45 | 0 | 38 | 205 | 32.5 | 32.5 | 100 | 36.4 | 112 |
| PRACTICAL EXAMPLE | 16 | 45 | 0 | 82 | 224 | 32.5 | 34.4 | 106 | 32.5 | 100 |
| PRACTICAL EXAMPLE | 17 | 45 | 0 | 82 | 224 | 32.5 | 36.4 | 112 | 32.5 | 100 |
| PRACTICAL EXAMPLE | 18 | 45 | 0 | 82 | 224 | 32.5 | 38.3 | 118 | 30.6 | 94 |
| PRACTICAL EXAMPLE | 19 | 45 | 0 | 82 | 224 | 32.5 | 40.3 | 124 | 28.6 | 88 |
| PRACTICAL EXAMPLE | 20 | 45 | 0 | 82 | 224 | 32.5 | 32.5 | 100 | 34.4 | 106 |
| PRACTICAL EXAMPLE | 21 | 45 | 0 | 82 | 224 | 32.5 | 32.5 | 100 | 36.4 | 112 |
| PRACTICAL EXAMPLE | 22 | 30 | 0 | 38 | 205 | 32.5 | 34.4 | 106 | 32.5 | 100 |
| PRACTICAL EXAMPLE | 23 | 60 | 0 | 38 | 205 | 32.5 | 34.4 | 106 | 32.5 | 100 |
| PRACTICAL EXAMPLE | 24 | 25 | 0 | 38 | 205 | 32.5 | 34.4 | 106 | 32.5 | 100 |
| PRACTICAL EXAMPLE | 25 | 70 | 0 | 38 | 205 | 32.5 | 34.4 | 106 | 32.5 | 100 |
| PRACTICAL EXAMPLE | 26 | 45 | -15 | 38 | 205 | 32.5 | 34.4 | 106 | 32.5 | 100 |
| PRACTICAL EXAMPLE | 27 | 45 | -30 | 38 | 205 | 32.5 | 34.4 | 106 | 32.5 | 100 |
| PRACTICAL EXAMPLE | 28 | 45 | 30 | 38 | 205 | 32.5 | 34.4 | 106 | 32.5 | 100 |
| PRACTICAL EXAMPLE | 29 | 45 | 45 | 38 | 205 | 32.5 | 34.4 | 106 | 32.5 | 100 |

FIG. 11

| PRACTICAL EXAMPLE/ COMPARATIVE EXAMPLE | TEST No. | WELDING CONDITIONS ||||||
|---|---|---|---|---|---|---|---|
| | | TORCH ANGLE θ (DEGREES) | LEADING AND TRAILING ANGLES (DEGREES) | STANDING-PLATE-SIDE MOVEMENT ANGLE α (DEGREES) | STANDING-PLATE-SIDE MOVEMENT ANGLE β (DEGREES) | ARC VOLTAGE V₀ (V) | ARC VOLTAGE V_Lower (V) / (%) | ARC VOLTAGE V_Upper (V) / (%) |

| PRACTICAL EXAMPLE/ COMPARATIVE EXAMPLE | TEST No. | TORCH ANGLE θ (DEGREES) | LEADING AND TRAILING ANGLES (DEGREES) | STANDING-PLATE-SIDE MOVEMENT ANGLE α (DEGREES) | STANDING-PLATE-SIDE MOVEMENT ANGLE β (DEGREES) | ARC VOLTAGE V₀ (V) | ARC VOLTAGE V_Lower (V) | ARC VOLTAGE V_Lower (%) | ARC VOLTAGE V_Upper (V) | ARC VOLTAGE V_Upper (%) |
|---|---|---|---|---|---|---|---|---|---|---|
| COMPARATIVE EXAMPLE | 30 | 45 | 0 | - | - | 33.0 | 33.0 | 100 | 33.0 | 100 |
| COMPARATIVE EXAMPLE | 31 | 45 | 0 | 136 | 278 | 33.0 | 33.0 | 100 | 33.0 | 100 |
| COMPARATIVE EXAMPLE | 32 | 45 | 0 | 155 | 322 | 33.0 | 33.0 | 100 | 33.0 | 100 |
| COMPARATIVE EXAMPLE | 33 | 45 | 0 | 167 | 342 | 33.0 | 33.0 | 100 | 33.0 | 100 |
| COMPARATIVE EXAMPLE | 34 | 45 | 0 | 176 | 355 | 33.0 | 33.0 | 100 | 33.0 | 100 |
| COMPARATIVE EXAMPLE | 35 | 45 | 0 | - | - | 32.5 | 28.6 | 88 | 32.5 | 100 |
| COMPARATIVE EXAMPLE | 36 | 45 | 0 | - | - | 32.5 | 30.6 | 94 | 32.5 | 100 |
| COMPARATIVE EXAMPLE | 37 | 45 | 0 | - | - | 32.5 | 34.4 | 106 | 32.5 | 100 |
| COMPARATIVE EXAMPLE | 38 | 45 | 0 | - | - | 32.5 | 36.4 | 112 | 32.5 | 100 |
| COMPARATIVE EXAMPLE | 39 | 45 | 0 | - | - | 32.5 | 32.5 | 100 | 28.6 | 88 |
| COMPARATIVE EXAMPLE | 40 | 45 | 0 | - | - | 32.5 | 32.5 | 100 | 30.6 | 94 |
| COMPARATIVE EXAMPLE | 41 | 45 | 0 | - | - | 32.5 | 32.5 | 100 | 34.4 | 106 |
| COMPARATIVE EXAMPLE | 42 | 45 | 0 | - | - | 32.5 | 32.5 | 100 | 36.4 | 112 |
| COMPARATIVE EXAMPLE | 43 | 45 | 0 | 167 | 342 | 32.5 | 34.4 | 106 | 32.5 | 100 |
| COMPARATIVE EXAMPLE | 44 | 45 | 0 | 167 | 342 | 32.5 | 36.4 | 112 | 32.5 | 100 |
| COMPARATIVE EXAMPLE | 45 | 45 | 0 | 167 | 342 | 32.5 | 32.5 | 100 | 34.4 | 106 |
| COMPARATIVE EXAMPLE | 46 | 45 | 0 | 167 | 342 | 32.5 | 32.5 | 100 | 36.4 | 112 |
| COMPARATIVE EXAMPLE | 47 | 45 | 0 | 136 | 278 | 32.5 | 34.4 | 106 | 32.5 | 100 |
| COMPARATIVE EXAMPLE | 48 | 45 | 0 | 136 | 278 | 32.5 | 36.4 | 112 | 32.5 | 100 |
| COMPARATIVE EXAMPLE | 49 | 45 | 0 | 136 | 278 | 32.5 | 32.5 | 100 | 34.4 | 106 |
| COMPARATIVE EXAMPLE | 50 | 45 | 0 | 136 | 278 | 32.5 | 32.5 | 100 | 36.4 | 112 |

FIG. 12

| PRACTICAL EXAMPLE/ COMPARATIVE EXAMPLE | TEST No. | LEG LENGTH | | | EVALUATION | FLANK ANGLE | | BEAD APPEARANCE | WELDING DEFECT |
|---|---|---|---|---|---|---|---|---|---|
| | | BOTTOM PLATE (mm) | STANDING PLATE (mm) | LEG LENGTH RATIO | EVALUATION | (DEGREES) | EVALUATION | | |
| PRACTICAL EXAMPLE | 1 | 7.3 | 6.3 | 0.86 | ○ | 107 | ○ | ○ | ○ |
| PRACTICAL EXAMPLE | 2 | 7.2 | 6.9 | 0.96 | ◎ | 105 | ○ | ○ | ○ |
| PRACTICAL EXAMPLE | 3 | 7.0 | 6.1 | 0.87 | ○ | 102 | ○ | ○ | ○ |
| PRACTICAL EXAMPLE | 4 | 7.1 | 6.1 | 0.86 | ○ | 91 | ○ | ○ | ○ |
| PRACTICAL EXAMPLE | 5 | 7.2 | 6.0 | 0.83 | ○ | 93 | ○ | ○ | ○ |
| PRACTICAL EXAMPLE | 6 | 8.0 | 7.3 | 0.91 | ○ | 120 | ◎ | ○ | ○ |
| PRACTICAL EXAMPLE | 7 | 7.8 | 7.2 | 0.92 | ○ | 130 | ◎ | ○ | ○ |
| PRACTICAL EXAMPLE | 8 | 7.8 | 7.2 | 0.92 | ○ | 138 | ○ | ○ | ○ |
| PRACTICAL EXAMPLE | 9 | 7.9 | 7.4 | 0.94 | ○ | 140 | ○ | ○ | ○ |
| PRACTICAL EXAMPLE | 10 | 7.4 | 7.3 | 0.99 | ◎ | 135 | ◎ | ○ | ○ |
| PRACTICAL EXAMPLE | 11 | 7.6 | 7.5 | 0.99 | ◎ | 134 | ◎ | ○ | ○ |
| PRACTICAL EXAMPLE | 12 | 7.4 | 7.2 | 0.97 | ◎ | 135 | ◎ | ○ | ○ |
| PRACTICAL EXAMPLE | 13 | 7.5 | 7.5 | 1.00 | ◎ | 134 | ◎ | ○ | ○ |
| PRACTICAL EXAMPLE | 14 | 7.5 | 7.6 | 1.01 | ◎ | 139 | ○ | ○ | ○ |
| PRACTICAL EXAMPLE | 15 | 7.6 | 7.9 | 1.04 | ◎ | 126 | ◎ | ○ | ○ |
| PRACTICAL EXAMPLE | 16 | 8.1 | 7.6 | 0.94 | ○ | 129 | ◎ | ○ | ○ |
| PRACTICAL EXAMPLE | 17 | 7.6 | 7.1 | 0.93 | ○ | 125 | ◎ | ○ | ○ |
| PRACTICAL EXAMPLE | 18 | 8.4 | 7.6 | 0.90 | ○ | 127 | ◎ | ○ | ○ |
| PRACTICAL EXAMPLE | 19 | 7.9 | 7.4 | 0.94 | ○ | 119 | ○ | ○ | ○ |
| PRACTICAL EXAMPLE | 20 | 7.3 | 7.8 | 1.07 | ○ | 141 | ○ | ○ | ○ |
| PRACTICAL EXAMPLE | 21 | 7.1 | 7.6 | 1.07 | ○ | 145 | ○ | ○ | ○ |
| PRACTICAL EXAMPLE | 22 | 7.4 | 7.6 | 1.03 | ◎ | 125 | ◎ | ○ | ○ |
| PRACTICAL EXAMPLE | 23 | 7.8 | 7.5 | 0.96 | ◎ | 130 | ◎ | ○ | ○ |
| PRACTICAL EXAMPLE | 24 | 7.1 | 7.8 | 1.10 | ○ | 124 | ◎ | ○ | ○ |
| PRACTICAL EXAMPLE | 25 | 7.8 | 7.1 | 0.91 | ○ | 120 | ◎ | ○ | ○ |
| PRACTICAL EXAMPLE | 26 | 7.5 | 7.3 | 0.97 | ◎ | 112 | ○ | ○ | ○ |
| PRACTICAL EXAMPLE | 27 | 7.8 | 7.6 | 0.97 | ◎ | 95 | ○ | ○ | ○ |
| PRACTICAL EXAMPLE | 28 | 7.4 | 7.2 | 0.97 | ◎ | 131 | ◎ | ○ | ○ |
| PRACTICAL EXAMPLE | 29 | 7.6 | 7.3 | 0.96 | ◎ | 142 | ○ | ○ | ○ |

FIG. 13

| PRACTICAL EXAMPLE/ COMPARATIVE EXAMPLE | TEST No. | LEG LENGTH | | EVALUATION | | | | |
|---|---|---|---|---|---|---|---|---|
| | | BOTTOM PLATE (mm) | STANDING PLATE (mm) | LEG LENGTH RATIO | EVALUATION | FLANK ANGLE (DEGREES) | EVALUATION | BEAD APPEARANCE | WELDING DEFECT |

| PRACTICAL EXAMPLE/ COMPARATIVE EXAMPLE | TEST No. | BOTTOM PLATE (mm) | STANDING PLATE (mm) | LEG LENGTH RATIO | EVALUATION | FLANK ANGLE (DEGREES) | EVALUATION | BEAD APPEARANCE | WELDING DEFECT |
|---|---|---|---|---|---|---|---|---|---|
| COMPARATIVE EXAMPLE | 30 | 7.3 | 6.0 | 0.82 | × | 90 | × | ○ | OVERLAP |
| COMPARATIVE EXAMPLE | 31 | 7.0 | 6.1 | 0.87 | ○ | 91 | ○ | EXCESSIVE SPATTER | INCOMPLETE FUSION |
| COMPARATIVE EXAMPLE | 32 | 7.1 | 6.3 | 0.89 | ○ | 93 | ○ | EXCESSIVE SPATTER | INCOMPLETE FUSION |
| COMPARATIVE EXAMPLE | 33 | 7.1 | 6.6 | 0.93 | ○ | 94 | ○ | EXCESSIVE SPATTER | INCOMPLETE FUSION |
| COMPARATIVE EXAMPLE | 34 | 7.1 | 6.4 | 0.90 | ○ | 95 | ○ | EXCESSIVE SPATTER | INCOMPLETE FUSION |
| COMPARATIVE EXAMPLE | 35 | 6.1 | 6.9 | 1.13 | ○ | 83 | × | EXCESSIVE SPATTER | OVERLAP |
| COMPARATIVE EXAMPLE | 36 | 6.8 | 6.8 | 1.00 | ◎ | 85 | × | ○ | OVERLAP |
| COMPARATIVE EXAMPLE | 37 | 7.6 | 6.4 | 0.84 | × | 101 | ○ | ○ | ○ |
| COMPARATIVE EXAMPLE | 38 | 7.4 | 6.1 | 0.82 | × | 103 | × | ○ | UNDERCUT |
| COMPARATIVE EXAMPLE | 39 | 7.7 | 5.9 | 0.77 | × | 87 | ○ | × | OVERLAP |
| COMPARATIVE EXAMPLE | 40 | 7.2 | 5.9 | 0.82 | × | 89 | × | × | OVERLAP |
| COMPARATIVE EXAMPLE | 41 | 8.1 | 5.9 | 0.73 | × | 110 | ◎ | ○ | UNDERCUT |
| COMPARATIVE EXAMPLE | 42 | 8.9 | 5.7 | 0.64 | × | 108 | ○ | ○ | UNDERCUT |
| COMPARATIVE EXAMPLE | 43 | 7.1 | 6.2 | 0.87 | ○ | 94 | ○ | EXCESSIVE SPATTER | INCOMPLETE FUSION |
| COMPARATIVE EXAMPLE | 44 | 7.2 | 6.1 | 0.85 | ○ | 96 | ○ | EXCESSIVE SPATTER | INCOMPLETE FUSION |
| COMPARATIVE EXAMPLE | 45 | 7.6 | 6.3 | 0.83 | × | 89 | × | EXCESSIVE SPATTER | INCOMPLETE FUSION |
| COMPARATIVE EXAMPLE | 46 | 7.7 | 6.3 | 0.82 | × | 88 | × | EXCESSIVE SPATTER | INCOMPLETE FUSION |
| COMPARATIVE EXAMPLE | 47 | 7.0 | 6.4 | 0.91 | ○ | 90 | ○ | EXCESSIVE SPATTER | INCOMPLETE FUSION |
| COMPARATIVE EXAMPLE | 48 | 7.2 | 6.3 | 0.88 | ○ | 89 | × | EXCESSIVE SPATTER | INCOMPLETE FUSION |
| COMPARATIVE EXAMPLE | 49 | 7.4 | 6.5 | 0.88 | ○ | 88 | × | EXCESSIVE SPATTER | INCOMPLETE FUSION |
| COMPARATIVE EXAMPLE | 50 | 7.0 | 6.2 | 0.89 | ○ | 87 | × | EXCESSIVE SPATTER | INCOMPLETE FUSION |

HORIZONTAL FILLET WELDING METHOD, HORIZONTAL FILLET WELDING SYSTEM, AND PROGRAM

TECHNICAL FIELD

The present invention relates to horizontal fillet welding methods, horizontal fillet welding systems, and programs.

BACKGROUND ART

When performing horizontal fillet welding on a medium-thickness or thick plate (referred to as "medium-to-thick plate" hereinafter) by using a consumable-electrode arc welding method, it is demanded that the leg length be large (referred to as "large leg length" hereinafter) and that a wide bead be ensured. In order to ensure a large leg length and a wide bead, it is necessary to increase the amount of weld deposition per unit weld length by, for example, increasing the welding current or reducing the welding rate. However, if the amount of weld deposition is to be increased by fixing the welding current and reducing the welding rate, the production efficiency decreases, and appropriate weld penetration may be not obtained. If the amount of weld deposition is to be increased by fixing the welding current and increasing the welding rate, the temperature of a molten pool may increase, sometimes resulting in reduced viscosity. In this case, the increased amount of weld deposition and the reduced viscosity of the molten pool cause the molten pool at a standing plate side to drip toward a bottom plate due to the effect of gravitational force, sometimes resulting in inferior bead appearance, such as the leg lengths at the standing plate side and the bottom plate side being different from target leg lengths, or welding defects, such as an overlap in which the edges of the bead are simply overlapped with abase material instead of being welded thereto. Normally, fillet welding refers to triangular welding that involves welding two substantially-orthogonal surfaces at, for example, a lap joint, a T-shaped joint, or a corner joint, and horizontal fillet welding refers to fillet welding performed in a downward-facing horizontal orientation.

In order to increase the production efficiency, welding is normally performed at a high welding rate. In order to maintain the amount of weld deposition per unit weld length as the welding rate increases, the welding current has to be increased. However, because the arc force applied to the molten pool increases as the welding current increases, the molten pool directly below the arc is pushed rearward. Thus, a groove formed by the arc at the standing plate side is not supplied with molten metal and thus remains as a groove so that an undercut may form, or the shape of the solidified bead may sometimes have inferior protruding appearance.

Accordingly, the large leg length and the high welding rate in fillet welding are problematic in that inferior bead appearance and welding defects, such as undercuts and overlaps, may occur.

Normally, a method used for solving such problems involves setting the arc voltage to a high value and reducing the arc force by increasing the arc length so as to improve the bead appearance. For example, Patent Literature 1 discloses a technology for improving weld penetration into a groove wall by reducing the welding current at both weaving edges to an electric current value at which an undercut does not occur and increasing the welding rate by increasing the electric current at an intermediate weaving portion, or by increasing the welding current at both weaving edges.

The term "weaving" in this case refers to an operation for oscillating the distal end of a welding torch with reference to a welding line of the base material as the center. FIG. 16 illustrates an example of a conventional weaving operation in horizontal fillet welding. In the example shown in FIG. 16, the bottom plate is disposed horizontally, and an end surface of the standing plate is disposed on the upper surface of the bottom plate. Fillet welding is performed on the junction at which the standing plate and the bottom plate meet (an abutment angle a at the junction is 90 degrees in the example in FIG. 16). As shown in the drawing, in the conventional weaving operation, welding is performed by causing an electrode provided at the distal end of a welding torch 101 to advance while alternately moving the electrode in directions substantially orthogonal to the welding travel direction.

FIG. 17 illustrates the weaving operation, as viewed from a T direction in FIG. 16. The T direction in FIG. 16 is inclined at 45 degrees (½ of a) from the bottom plate and is perpendicular to the welding line (i.e., welding travel direction). As shown in the drawing, in accordance with the conventional weaving operation, the welding torch 101 repeatedly moves to the weaving edges so as to constantly oscillate forward in the welding travel direction.

CITATION LIST

Patent Literature

PTL 1: Japanese Unexamined Patent Application Publication No. 2002-321055

SUMMARY OF INVENTION

Technical Problem

Even if the arc voltage is set to a high value for improving the bead appearance, insufficient weld penetration may occur, or the shield gas for mainly protecting, for example, the molten metal and the arc from the atmosphere may become insufficient, thus making it difficult to sufficiently protect the molten metal and the arc. Furthermore, even if the welding current is adjusted at both weaving edges, it is necessary to increase the amount of weld deposition in a case where horizontal fillet welding is to be performed with a large leg length and at a high rate on a medium-to-thick plate. Thus, welding defects, such as inferior bead appearance and an overlap at the bottom plate side, caused by the molten pool at the standing plate side dripping toward the bottom plate due to the effect of gravitational force are not necessarily suppressed.

An object of the present invention is to suppress the occurrence of inferior bead appearance and welding defects in horizontal fillet welding.

Solution to Problem

In order to achieve the aforementioned object, the present invention provides a horizontal fillet welding method for performing welding along a welding line by using a junction at which a standing plate and a bottom plate meet as the welding line and causing an electrode to perform a weaving operation with reference to the welding line as a center. The weaving operation includes moving the electrode forward in a welding travel direction to a bottom-plate-side weaving edge and moving the electrode rearward against the welding travel direction to a standing-plate-side weaving edge when the electrode reaches the bottom-plate-side weaving edge, the weaving operation being repeated at the bottom plate side and the standing plate side.

When the electrode is moved forward in the welding travel direction to the bottom-plate-side weaving edge in the weaving operation, a bottom-plate-side movement angle β (degrees), which is an angle formed between a trajectory of the electrode and an opposite direction from the welding travel direction, may be between 185 degrees and 250 degrees inclusive. When the electrode is moved rearward against the welding travel direction to the standing-plate-side weaving edge, a standing-plate-side movement angle α (degrees), which is an angle formed between the trajectory of the electrode and the opposite direction from the welding travel direction, may be between 5 degrees and 85 degrees inclusive. The standing-plate-side movement angle α and the bottom-plate-side movement angle β may have a relationship α>(β−180).

Moreover, the standing-plate-side movement angle α may be between 10 degrees and 45 degrees inclusive and the bottom-plate-side movement angle β may be between 185 degrees and 215 degrees inclusive in the weaving operation.

Furthermore, a torch tilt angle at which the electrode is tilted relative to the bottom plate may be between 30 degrees and 60 degrees inclusive from the bottom plate, an upper limit for a leading angle at which the electrode is tilted toward an opposite side from the welding travel direction may be 40 degrees, and an upper limit for a trailing angle at which the electrode is tilted in the welding travel direction may be 15 degrees.

Control may be performed such that at least one of an arc voltage at the standing-plate-side weaving edge and an arc voltage at the bottom-plate-side weaving edge is increased or decreased relative to an arc voltage at a welding-line center position, and the arc voltage at the standing-plate-side weaving edge may be set to be lower than the arc voltage at the bottom-plate-side weaving edge.

Furthermore, the arc voltage at the standing-plate-side weaving edge may be set to a voltage that suppresses an undercut, and the arc voltage at the bottom-plate-side weaving edge may be set to a voltage that suppresses an overlap.

Moreover, an arc voltage when the electrode moves at the bottom plate side and the standing plate side may change in any one of three manners including a linear manner, a stepwise manner, and a curved manner or in a combination of two or more manners of the three manners in synchronization with the weaving operation.

The present invention also provides a horizontal fillet welding system that performs welding along a welding line by using a junction at which a standing plate and a bottom plate meet as the welding line and causing an electrode to perform a weaving operation with reference to the welding line as a center. The weaving operation includes moving the electrode forward in a welding travel direction to a bottom-plate-side weaving edge and moving the electrode rearward against the welding travel direction to a standing-plate-side weaving edge when the electrode reaches the bottom-plate-side weaving edge, the weaving operation being repeated at the bottom plate side and the standing plate side.

Furthermore, the present invention provides a program used in a horizontal fillet welding system that performs welding along a welding line by using a junction at which a standing plate and a bottom plate meet as the welding line and causing an electrode to perform a weaving operation with reference to the welding line as a center. The program causes the horizontal fillet welding system to realize a function of performing the weaving operation including moving the electrode forward in a welding travel direction to a bottom-plate-side weaving edge and moving the electrode rearward against the welding travel direction to a standing-plate-side weaving edge when the electrode reaches the bottom-plate-side weaving edge, the weaving operation being repeated at the bottom plate side and the standing plate side.

Advantageous Effects of Invention

According to the present invention, the occurrence of inferior bead appearance and welding defects in horizontal fillet welding can be suppressed.

BRIEF DESCRIPTION OF DRAWINGS

FIG. 10 illustrates various kinds of conditions in practical examples.

FIG. 11 illustrates various kinds of conditions in comparative examples.

FIG. 12 illustrates test results obtained in the practical examples.

FIG. 13 illustrates test results obtained in the comparative examples.

DESCRIPTION OF EMBODIMENTS

An embodiment of the present invention will be described in detail below with reference to the appended drawings.
<System Configuration>

Figure 1:
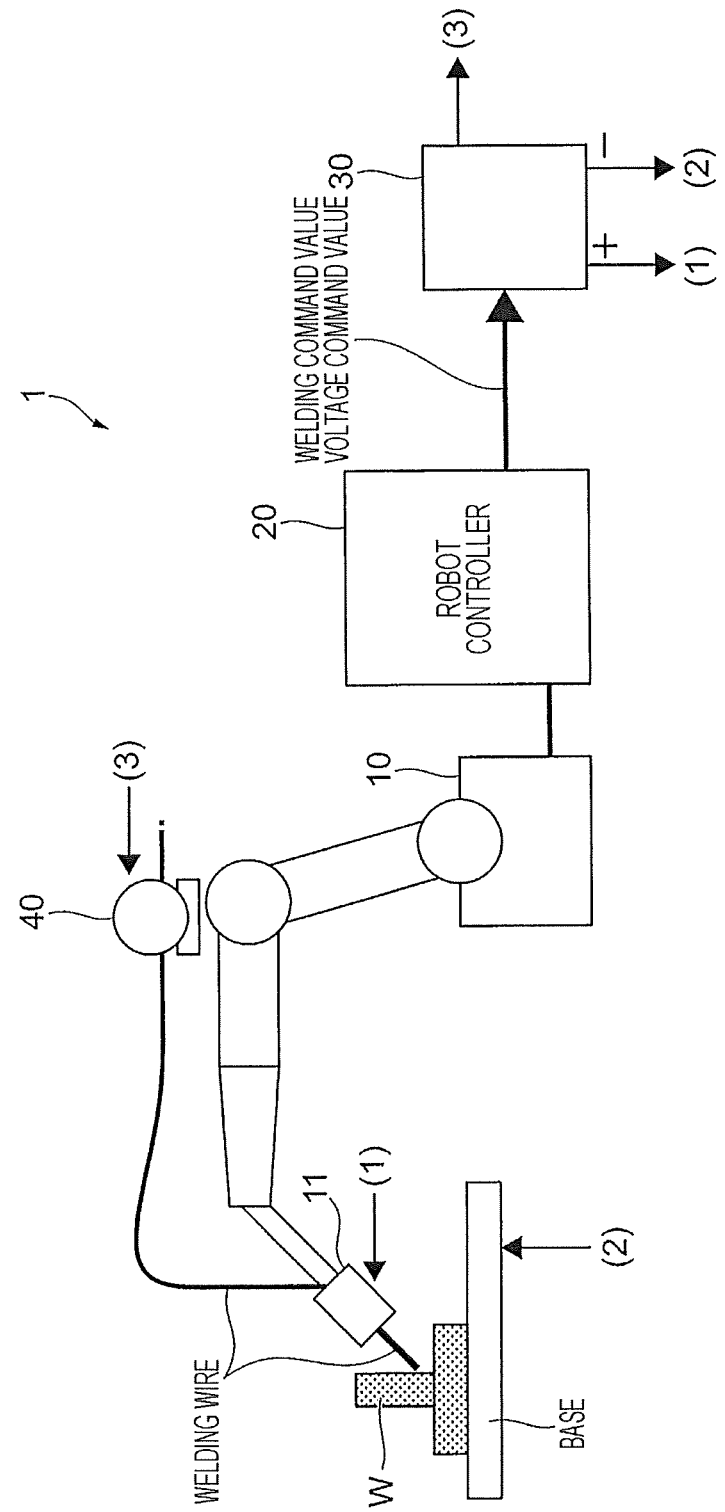
FIG. 1 illustrates an example of a schematic configuration of a welding system according to an embodiment.

First, a welding system 1 according to this embodiment will be described. FIG. 1 illustrates an example of a schematic configuration of the welding system 1 according to this embodiment.

As shown in FIG. 1, the welding system 1 according to this embodiment includes a welding robot 10, a robot controller 20, a welding power supply 30, and a feeding device 40. The welding power supply 30 is connected to an electrode via a positive power cable (1) and is also connected to a workpiece W via a negative power cable (2). In the drawing, a power cable (3) connects the welding power supply 30 and the feeding device 40 for a welding wire and controls the feed rate of the welding wire. By using an arbitrary position near the junction at which a standing plate and a bottom plate meet in a T shape as a welding line, the welding system 1 performs horizontal fillet welding along the welding line. The range near the junction is, for example, 30 mm toward the bottom plate and 30 mm toward the standing plate from the junction.

The welding robot 10 releases arc from the electrode and uses the heat thereof to weld the workpiece W (i.e., a base material, namely, the standing plate and the bottom plate) serving as a welding target. The welding robot 10 has a welding torch 11 that supports the electrode. The welding robot 10 causes the electrode provided at the distal end of the welding torch 11 to perform a weaving operation with reference to the welding line as the center, so as to perform welding along the welding line (i.e., in the welding travel direction).

The distal end of the welding torch 11 supports a welding material (referred to as "welding wire" hereinafter) serving as an electrode and protruding by a fixed length from the distal end of a cylindrical conductor called a contact tip. A welding method used in this embodiment is a consumable electrode method that involves melting the welding wire by bringing the contact tip and the welding wire into contact with each other and applying an arc voltage thereto so as to generate arc between the workpiece W and the distal end of the welding wire. The protruding length of the electrode during the welding process is preferably 40 mm at maximum and 15 mm at minimum. If the protruding length exceeds 40 mm, sufficient weld penetration may be not obtained along the welding line, or a possibility of the occurrence of welding defects caused by deteriorated shielding performance may increase. If the protruding length is below 15 mm, the welding current increases, which tends to cause a welding defect to occur at a weaving edge.

Furthermore, the welding torch 11 includes a shield gas nozzle (i.e., a mechanism that discharges shield gas). Examples of the shield gas that may be used include 100% $CO_2$, 100% Ar, and Ar mixed with $CO_2$. In particular, it is preferable to use 100% $CO_2$ due to its high weld penetration effect. In view of preventing shield gas degradation, it is preferable that the upper limit of the gas flow be 40 liters per minute and the lower limit be 15 liters per minute.

The robot controller 20 controls the operation of the welding robot 10. The robot controller 20 preliminarily retains teaching data containing an operational pattern, a welding start position, a welding end position, and welding conditions of the welding robot 10, and controls the operation of the welding robot 10 by indicating the teaching data to the welding robot 10. Furthermore, during the welding process, the robot controller 20 commands the welding power supply 30 to control the electric power in accordance with the teaching data.

The welding power supply 30 supplies electric power to the electrode and the workpiece W in response to the command from the robot controller 20 so as to generate arc between the electrode and the workpiece W. Moreover, the welding power supply 30 supplies electric power to the feeding device 40 in response to the command from the robot controller 20. The electric current during the welding process may be direct current or alternating current, and the waveform thereof is not particularly limited and may be, for example, rectangular wave or triangular wave pulses.

The feeding device 40 feeds the welding wire to the welding torch 11 as the welding process progresses. The welding wire fed by the feeding device 40 is not particularly limited and is selected in accordance with the properties and the weldability of the workpiece W. For example, a solid wire or a flux-cored wire is used. Moreover, the material of the welding wire is not limited. For example, soft steel, stainless steel, aluminum, or titanium may be used. Furthermore, the diameter of the welding wire is not particularly limited. In this embodiment, the diameter is preferably 1.6 mm at maximum and 1.0 mm at minimum.

Figure 2:
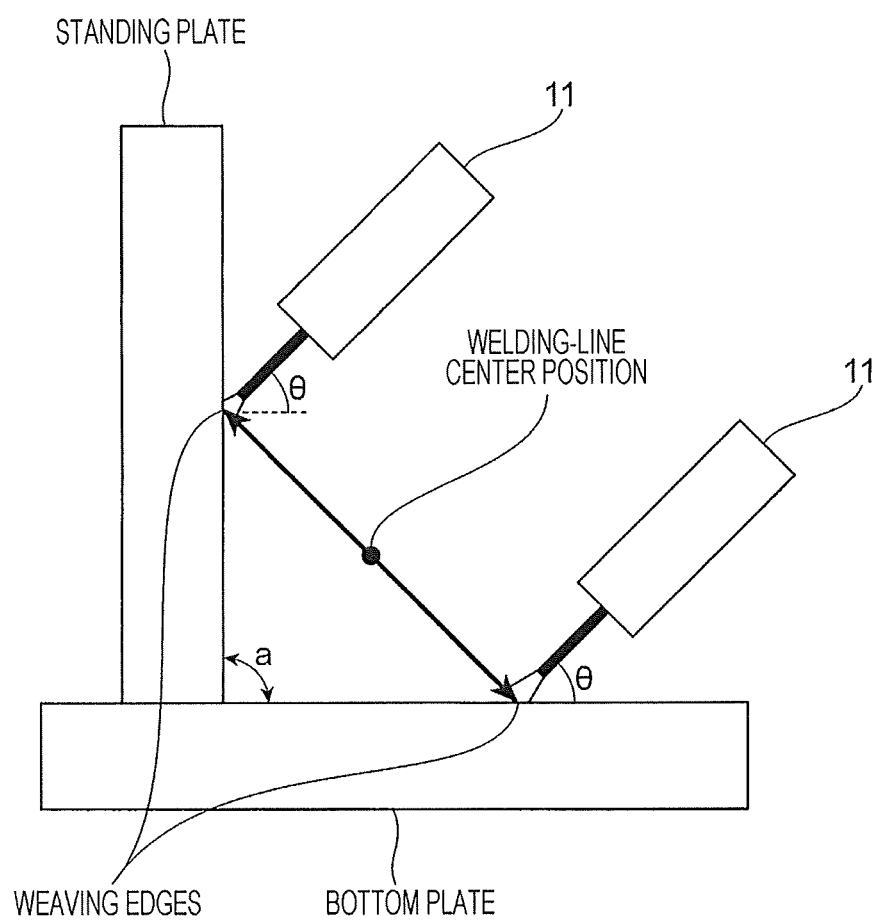
FIG. 2 schematically illustrates a horizontal fillet welding process according to this embodiment, as viewed from a welding travel direction.

FIG. 2 schematically illustrates a horizontal fillet welding process according to this embodiment, as viewed from the welding travel direction. As shown in the drawing, the bottom plate is disposed horizontally, and an end surface of the standing plate is disposed on the upper surface of the bottom plate. Fillet welding is performed on the junction at which the standing plate and the bottom plate meet (an abutment angle a at the junction is 90 degrees in the example in FIG. 2). The welding process progresses in the direction perpendicular to the plane of the drawing. The welding torch 11 performs weaving alternately in directions indicated by arrows, that is, in a direction extending toward the bottom plate and in a direction extending toward the standing plate. Furthermore, the welding process is performed by tilting the welding torch 11 such that an angle formed between the bottom plate and the electrode (referred to as "torch tilt angle θ" hereinafter) is, for example, 45 degrees. Moreover, a welding-line center position indicates a position on the welding line between a bottom-plate-side weaving edge and a standing-plate-side weaving edge.

<Weaving>

Figure 16:
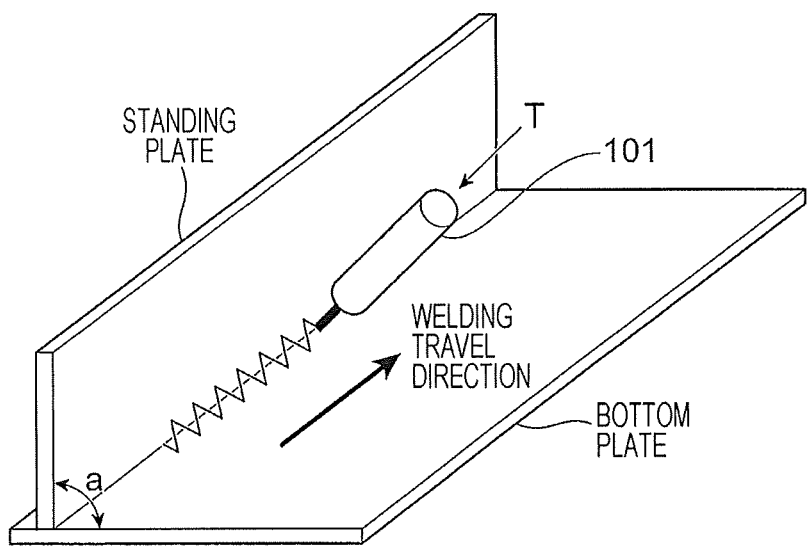
FIG. 16 illustrates an example of a conventional weaving operation in horizontal fillet welding.
Figure 17:
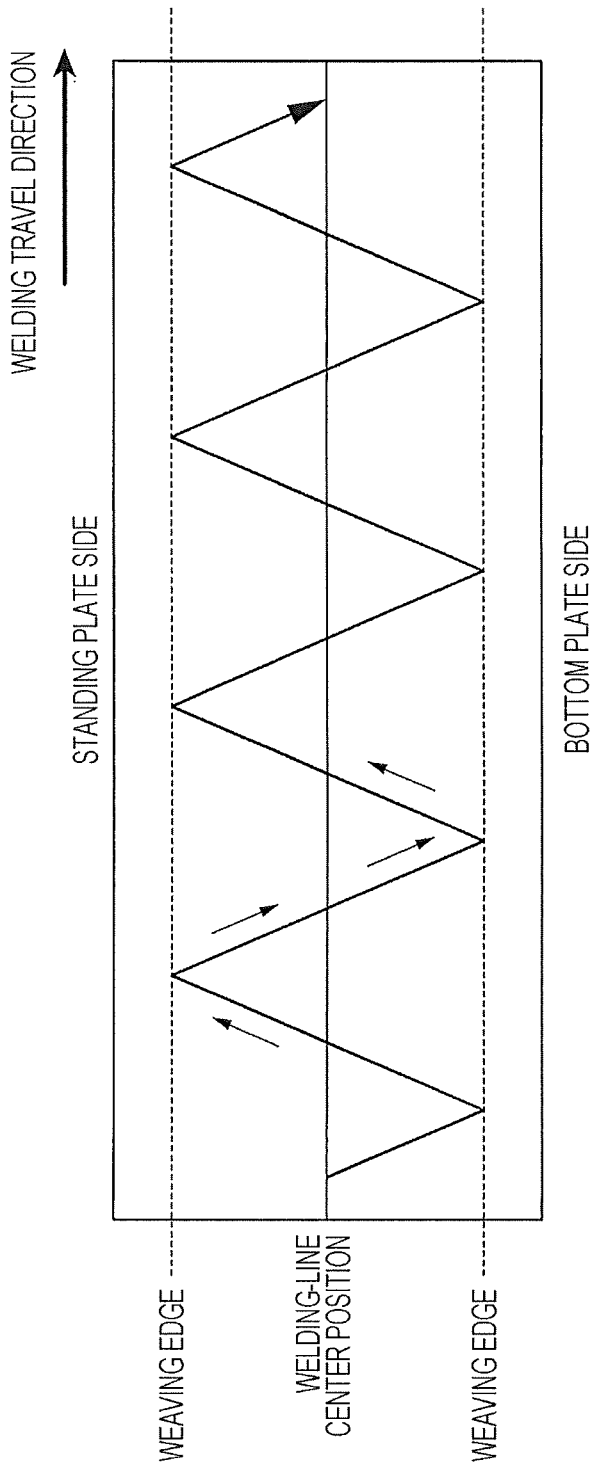
FIG. 17 is a diagram for explaining the weaving operation, as viewed from a T direction in FIG. 16.

Next, a weaving operation employed in this embodiment will be described. As shown in FIGS. 16 and 17, in the conventional weaving operation, the electrode travels so as to move alternately toward the standing plate and the bottom plate relative to the welding travel direction, and constantly oscillates forward in the welding travel direction. In this embodiment, the electrode performs a weaving operation by moving forward toward the bottom plate and rearward toward the standing plate relative to the welding travel direction.

Figure 3:
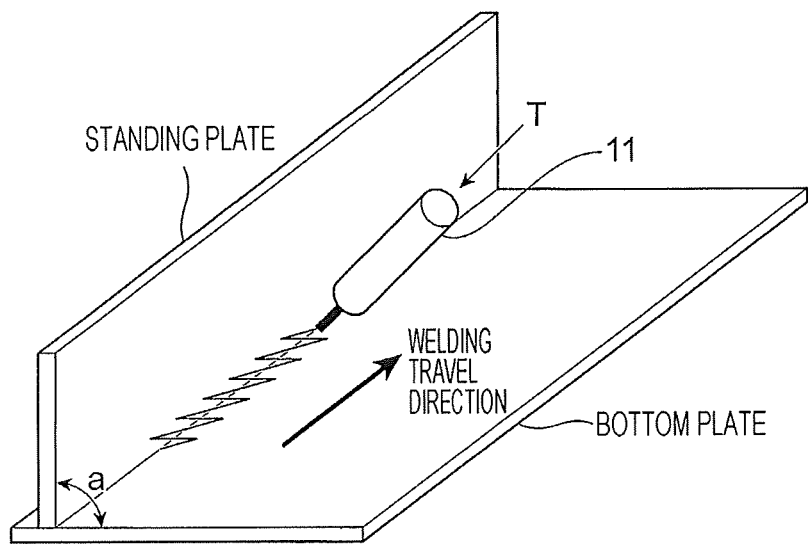
FIG. 3 illustrates an example of a weaving operation according to this embodiment.

FIG. 3 illustrates an example of the weaving operation according to this embodiment. As shown in the drawing, when the electrode first moves forward in the welding travel direction toward the bottom-plate-side weaving edge and reaches the bottom-plate-side weaving edge, the electrode moves rearward against the welding travel direction toward the standing-plate-side weaving edge. Specifically, in the conventional weaving operation, the welding torch 101 constantly oscillates forward in the welding travel direction, as shown in FIGS. 16 and 17. In contrast, in this embodiment, the electrode operates so as to move forward toward the bottom plate and rearward toward the standing plate. Accordingly, the electrode repeats the weaving operation by moving toward the standing-plate-side weaving edge and the bottom-plate-side weaving edge.

The electrode moves rearward against the welding travel direction toward the standing-plate-side weaving edge so that heat caused by the arc is distributed toward the standing plate and the bottom plate, thereby improving the cooling capacity of the molten pool. Furthermore, during the rearward movement, the molten metal is supported by the bead formed during the movement toward the bottom plate. With this improvement in the cooling capacity, a decrease in the viscosity of the molten metal can be suppressed, and the molten metal at the standing plate side is formed at the bottom plate side so as to be supported by the cooled molten metal having high viscosity. Therefore, the molten metal at the standing plate side is prevented from dripping due to gravitational force, whereby appropriate bead appearance with a large leg length can be ensured and welding defects can also be suppressed. The positions of the weaving edges (or the distance from the welding line to each weaving edge) are determined by setting the weaving width as a welding condition.

Figure 4:
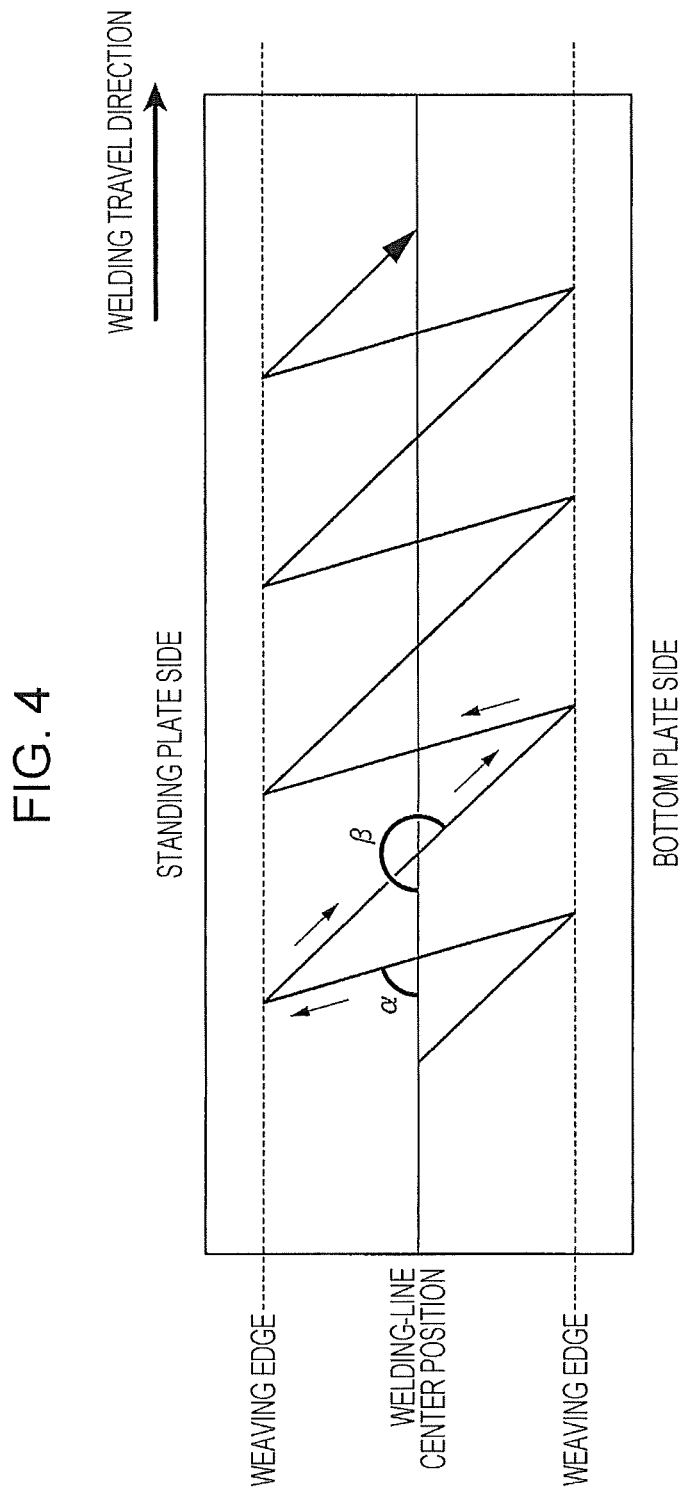
FIG. 4 illustrates the weaving operation, as viewed from a T direction in FIG. 3.

FIG. 4 illustrates the weaving operation, as viewed from a T direction in FIG. 3. The T direction in FIG. 3 is inclined at 45 degrees (½ of an abutment angle a) from the bottom plate and is perpendicular to the welding line (i.e., welding travel direction). An angle formed between the trajectory of the electrode and the welding line (i.e., the opposite direction from the welding travel direction) when the electrode moves rearward against the welding travel direction toward the standing-plate-side weaving edge will be defined as a standing-plate-side movement angle α. An angle (>180 degrees) formed between the trajectory of the electrode and the welding line (i.e., the opposite direction from the welding travel direction) when the electrode moves forward in the welding travel direction toward the bottom-plate-side weaving edge will be described as a bottom-plate-side movement angle β.

In order for the welding process to progress in the welding travel direction, the standing-plate-side movement angle α and the bottom-plate-side movement angle β need to have the relationship α>(β−180°).

In this embodiment, it is preferable that the weaving operation be performed such that the standing-plate-side movement angle α is 85 degrees at maximum and 5 degrees at minimum. If the standing-plate-side movement angle α is below 5 degrees, the molten metal at the bottom plate side may have solidified by the time the electrode reaches the standing-plate-side weaving edge, resulting in the occurrence of incomplete fusion or slag inclusion. If the standing-plate-side movement angle α exceeds 85 degrees, the molten metal at the standing plate side tends to drip due to gravitational force, causing the arc length to change due to the fluctuating molten pool. Thus, spatter may occur during the welding process, or incomplete fusion or inferior bead appearance may occur. Moreover, in order to suppress dripping of the molten metal at the standing plate side due to gravitational force and to obtain more favorable bead appearance in accordance with a uniform leg length for the standing plate and the bottom plate, it is preferable that the standing-plate-side movement angle α be 45 degrees at maximum and 10 degrees at minimum.

In this embodiment, it is preferable that the weaving operation be performed such that the bottom-plate-side movement angle β is 250 degrees at maximum and 185 degrees at minimum. If the bottom-plate-side movement angle β is below 185 degrees, the balance of the amount of weld deposition per cycle is lost, possibly causing inferior bead appearance to occur. If the bottom-plate-side movement angle β exceeds 250 degrees, the effect of the cooling capacity of the molten pool does not occur, so that the molten metal at the standing plate side tends to drip due to gravitational force, thus causing the arc length to change due to the fluctuating molten pool. Thus, spatter may occur, or incomplete fusion or inferior bead appearance may occur. Moreover, in order to suppress dripping of the molten metal at the standing plate side due to gravitational force and to obtain more favorable bead appearance in accordance with a uniform leg length for the standing plate and the bottom plate, it is preferable that the bottom-plate-side movement angle β be 215 degrees at maximum and 185 degrees at minimum.

<Torch Tilt Angle>

Next, the torch tilt angle θ in this embodiment will be described. Although the magnitude of the torch tilt angle θ is not limited in this embodiment, it is preferable that the torch tilt angle β be 60 degrees at maximum and 30 degrees at minimum. When the torch tilt angle θ ranges between 30 degrees and 60 degrees inclusive, sufficient weld penetration can be ensured, and more favorable bead appearance can be obtained. As shown in FIG. 2, the torch tilt angle θ may be fixed during the weaving period or may be changed during the weaving period.

Figure 5:
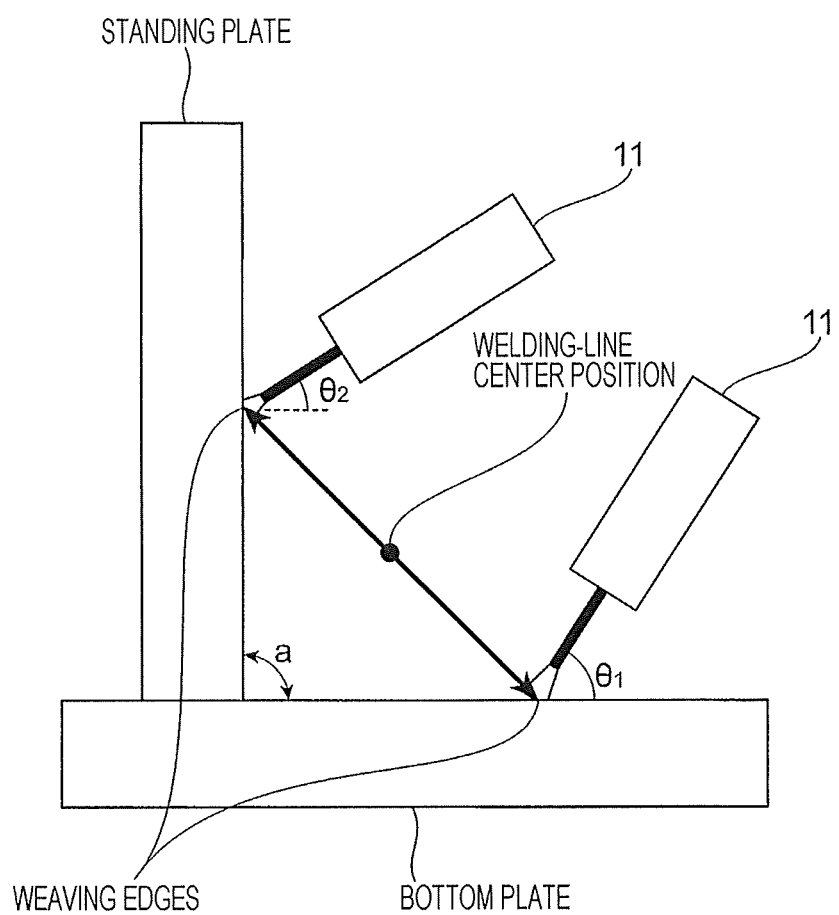
FIG. 5 illustrates an example where a torch tilt angle θ is changed during a weaving period.

FIG. 5 illustrates an example where the torch tilt angle θ is changed during the weaving period. In the example shown in FIG. 5, the torch tilt angle θ is changed during the movement from the bottom-plate-side weaving edge toward the welding-line center position and further toward the standing-plate-side weaving edge. In detail, the welding torch 11 is set at a larger torch tilt angle θ (i.e., angle θ1 in the example shown in FIG. 5) at the bottom-plate-side weaving edge than at the welding-line center position. In contrast, the welding torch 11 is set at a smaller torch tilt angle θ (i.e., angle θ2 in the example shown in FIG. 5) at the standing-plate-side weaving edge than at the welding-line center position. Accordingly, it is more preferable to vary the torch tilt angle θ between when the welding torch 11 is located at the welding-line center position and when the welding torch 11 is located at a weaving edge so that the arc at the weaving edge becomes stable and spatter is reduced.

<Leading Angle and Trailing Angle>

Figure 6A:
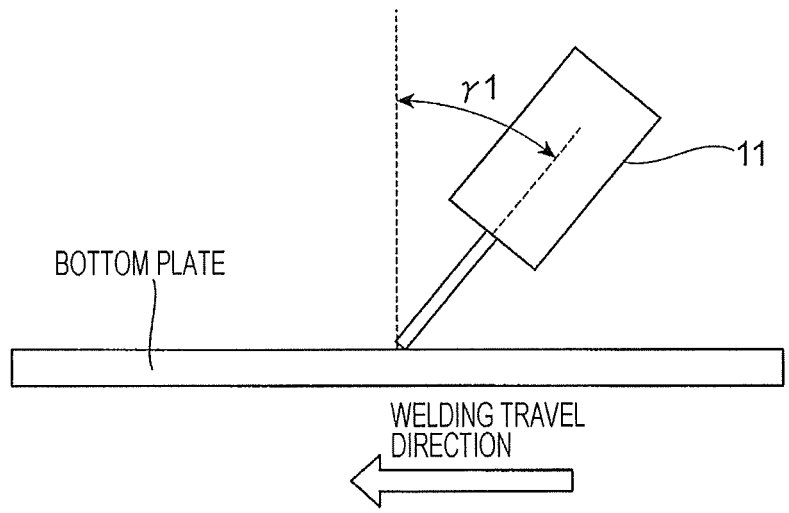
FIG. 6A is a diagram for explaining an example of a leading angle and a trailing angle.
Figure 6B:
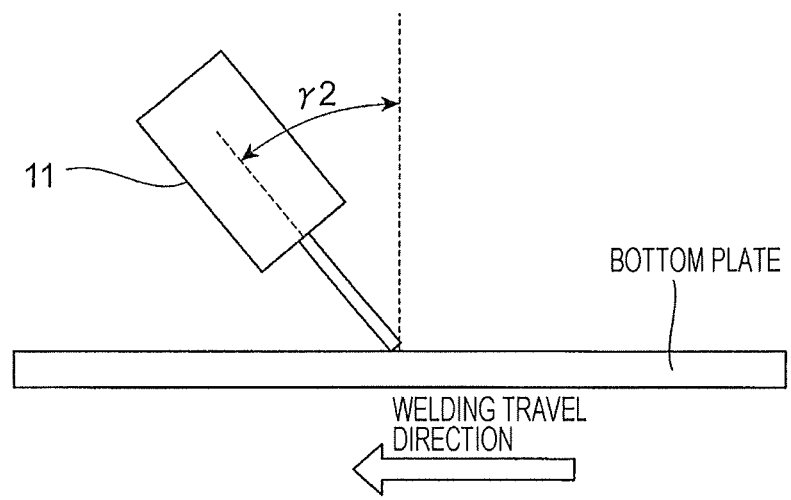
FIG. 6B is a diagram for explaining an example of a leading angle and a trailing angle.

Next, a leading angle and a trailing angle in this embodiment will be described. In this embodiment, the leading angle and the trailing angle may be added by providing the torch tilt angle θ and tilting the welding torch 11 relative to the welding travel direction (i.e., tilting the electrode). FIGS. 6A and 6B are diagrams for explaining examples of the leading angle and the trailing angle. In the example shown in FIG. 6A, the electrode is tilted in the opposite direction from the welding travel direction such that the leading angle of the electrode is γ1. In the example shown in FIG. 6B, the electrode is tilted in the welding travel direction such that the trailing angle of the electrode is γ2. Specifically, a leading angle is added when γ1 is a positive value. When γ1 is a negative value, such as −10 degrees, γ2 is equal to 10 degrees, so that a trailing angle is added.

By adding a leading angle to the electrode, the arc travels ahead so that the bead has good conformability, resulting in a favorable bead shape. However, since the direction of weld penetration is oriented forward, the weld penetration depth becomes smaller. In contrast, by adding a trailing angle to the electrode, the bead shape tends to become a protruding shape, but deeper weld penetration can be ensured.

In this embodiment, in order to obtain appropriate weld penetration along the welding line and a favorable bead shape, it is more preferable that the leading angle range between −15 degrees and 40 degrees inclusive. In other words, it is more preferable that the electrode be tilted within a range in which the leading angle is 40 degrees at maximum and the trailing angle is 15 degrees at maximum.

<Arc Voltage>

Next, the arc voltage in this embodiment will be described. Because an increase and decrease in the arc voltage have an effect on the arc force, such an increase and decrease affect the weld penetration depth and the bead shape. In the case of fillet welding, it is preferable that the arc voltage can ensure weld penetration along the welding line and can prevent undercuts and overlaps at the weaving edges. At the standing-plate-side weaving edge, the molten pool is pushed rearward by the arc force, and the molten pool drips toward the bottom plate due to the effect of gravitational force, thus causing an undercut to occur readily. At the bottom-plate-side weaving edge, the molten pool at the standing plate drips and overlaps with the base material without fusing, thus causing an overlap to occur readily.

In this embodiment, control is performed such that at least one of the arc voltage (referred to as "standing-plate-side voltage" hereinafter) when the electrode moves toward the standing-plate-side weaving edge and the arc voltage (referred to as "bottom-plate-side voltage" hereinafter) when the electrode moves toward the bottom-plate-side weaving edge is increased or decreased relative to the arc voltage at the welding-line center position.

If the arc voltage at the standing plate side is set to a low value, the width of the arc becomes narrow and the range of the melting metal becomes smaller, so that undercuts at the standing plate side are suppressed. If the arc voltage at the bottom plate side is set to a high value, the molten metal overlapped with the base material is spread out more, so that overlaps at the bottom plate side are suppressed. Therefore, in this embodiment, the arc voltage is controlled such that the standing-plate-side voltage is lower than the bottom-plate-side voltage (i.e., the bottom-plate-side voltage is higher than the standing-plate-side voltage). In other words, the standing-plate-side voltage is set to a voltage that suppresses undercuts, and the bottom-plate-side weaving edge is set to a voltage that suppresses overlaps.

Accordingly, in this embodiment, the occurrence of inferior bead appearance and welding defects is suppressed in accordance with the weaving operation, and a difference in the magnitude of arc voltage is provided between the standing-plate side and the bottom-plate side, so that welding defects, such as undercuts and overlaps, are further suppressed.

Figure 7:
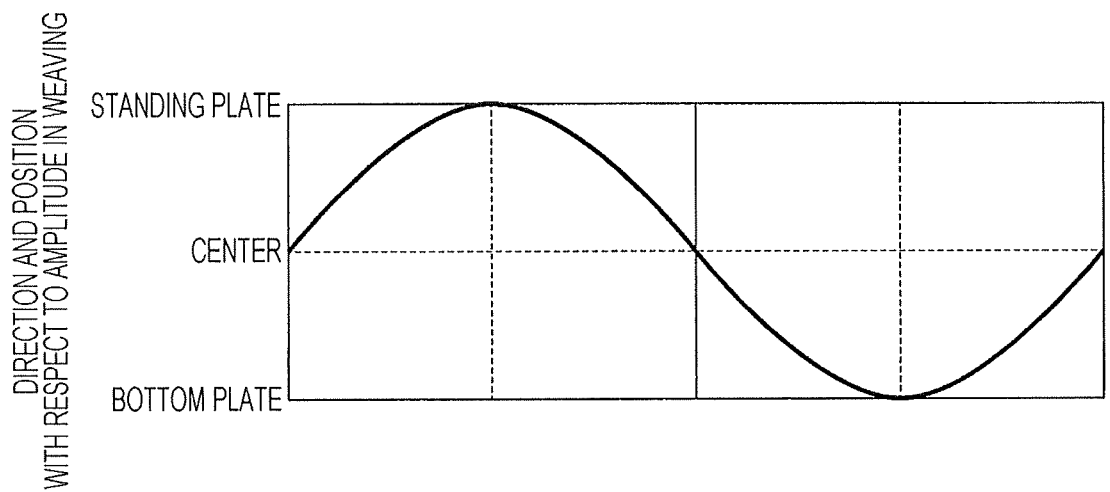
FIG. 7 illustrates an example of the amplitude of an electrode in the weaving operation.
Figure 8A:
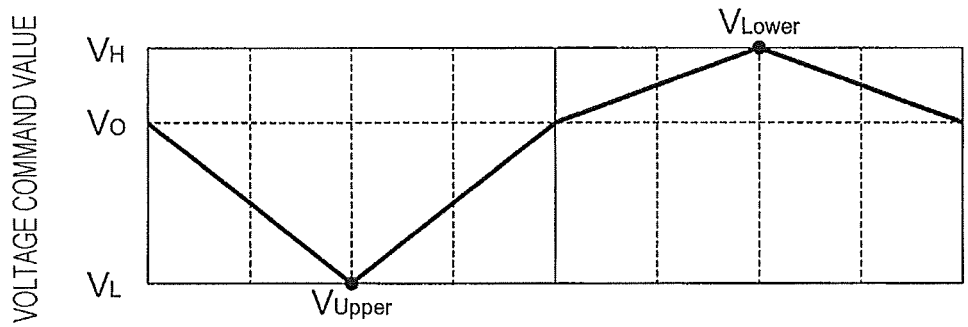
FIG. 8A illustrates an example of an arc voltage controlled in accordance with a weaving trajectory.
Figure 8B:
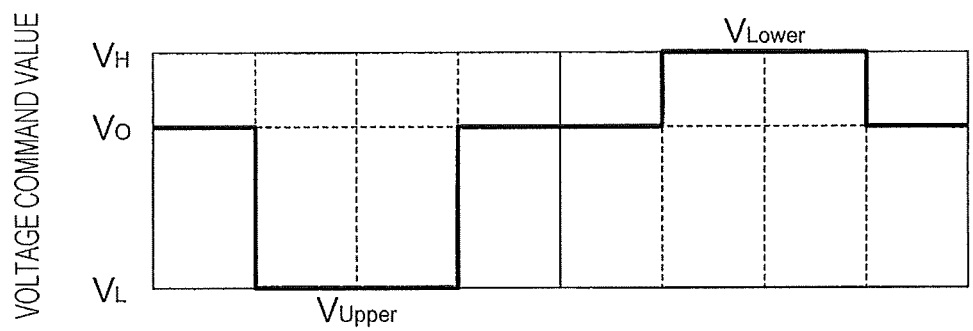
FIG. 8B illustrates an example of an arc voltage controlled in accordance with a weaving trajectory.
Figure 8C:
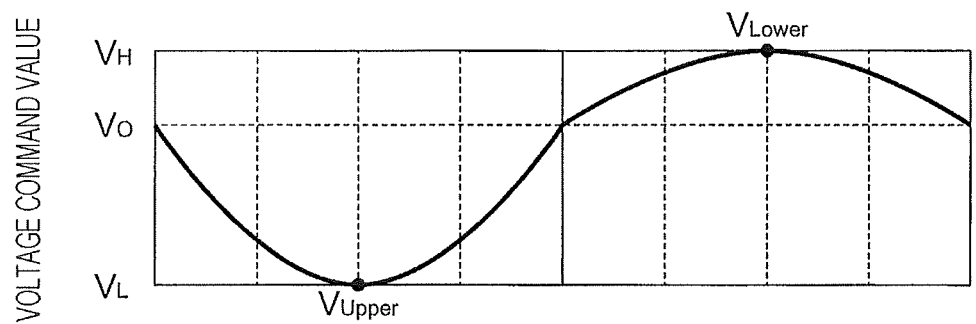
FIG. 8C illustrates an example of an arc voltage controlled in accordance with a weaving trajectory.

Furthermore, it is preferable that control be performed such that the arc voltage changes in a linear manner, stepwise manner, or curved manner in synchronization with the weaving operation of the electrode. FIG. 7 illustrates an example of the amplitude of the electrode in the weaving operation. FIGS. 8A to 8C each illustrate an example of the arc voltage controlled in accordance with a weaving trajectory. In the example shown in FIG. 7, a weaving operation equivalent to one cycle is shown, and the electrode moves toward the standing-plate-side weaving edge and the bottom-plate-side weaving edge. In this case, although the electrode does not move rearward toward the standing plate, the example shown in FIG. 7 indicates that the electrode moves toward both weaving edges in one cycle, and in actuality, the electrode moves rearward toward the standing plate, as shown in FIGS. 3 and 4.

In the example shown in FIG. 8A, the arc voltage changes linearly in accordance with the weaving trajectory shown in FIG. 7. In this case, $V_H$ denotes the higher voltage, $V_L$ denotes the lower voltage, $V_{Lower}$ denotes the bottom-plate-side voltage, and $V_{Upper}$ denotes the standing-plate-side voltage. If the electrode is located at the standing plate side relative to the welding line, the arc voltage is set to be lower than the arc voltage ($V_O$) at the welding-line center position. If the electrode is located at the bottom plate side relative to the welding line, the arc voltage is set to be higher than the arc voltage $V_O$ at the welding-line center position.

In the example shown in FIG. 8B, the arc voltage changes in a stepwise manner in accordance with the weaving trajectory shown in FIG. 7. If the electrode is located at the standing plate side relative to the welding line, the arc voltage is set to be lower than $V_O$. If the electrode is located at the bottom plate side relative to the welding line, the arc voltage is set to be higher than $V_O$. Furthermore, in the example shown in FIG. 8C, the arc voltage changes in a curved manner in accordance with the weaving trajectory shown in FIG. 7. If the electrode is located at the standing plate side relative to the welding line, the arc voltage is set to be lower than $V_O$. If the electrode is located at the bottom plate side relative to the welding line, the arc voltage is set to be higher than $V_O$.

Accordingly, the arc voltage is controlled in a linear manner, stepwise manner, or curved manner in accordance with the weaving trajectory, thereby ensuring favorable bead appearance while ensuring weld penetration along the welding line.

Figure 9:
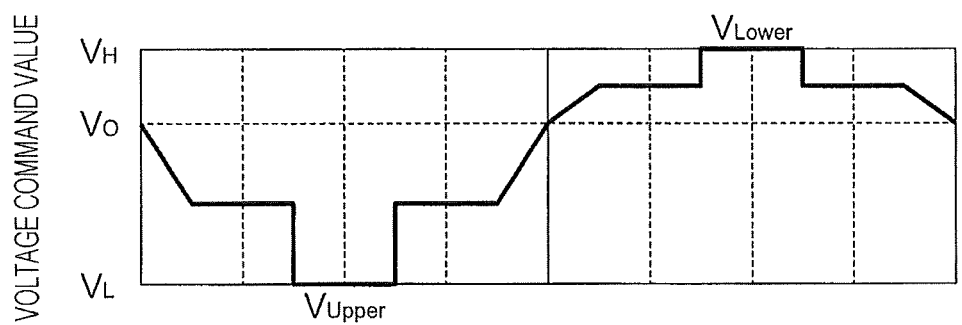
FIG. 9 illustrates an example where control is performed such that the arc voltage changes in a linear and stepwise manner in accordance with a weaving trajectory.

Furthermore, control may be performed such that the arc voltage changes in a combination of two or more manners (e.g., a linear and stepwise manner or a linear and curved manner) of the three manners, namely, the linear manner, stepwise manner, and curved manner. FIG. 9 illustrates an example where control is performed such that the arc voltage changes in a linear and stepwise manner in accordance with the weaving trajectory. In the example shown in FIG. 9, when the electrode first moves from the welding-line center position to the standing-plate-side weaving edge, the arc voltage changes in a linear manner and then changes in a stepwise manner from an intermediate position. When the electrode moves from the welding-line center position to the bottom-plate-side weaving edge after reaching the standing-plate-side weaving edge, the arc voltage changes in a linear manner and then changes in a stepwise manner from an intermediate position.

As mentioned above, it is preferable that the standing-plate-side voltage be lower than the bottom-plate-side voltage. It is more preferable that the standing-plate-side voltage range between 85% and 100% inclusive relative to the arc voltage value at the welding-line center position (i.e., the arc voltage value along the welding line) and that the bottom-plate-side voltage range between 100% and 125% inclusive relative to the arc voltage value at the welding-line center position.

If the standing-plate-side voltage falls below 85% relative to the arc voltage value at the welding-line center position, there is a possibility of the occurrence of spatter at the standing-plate-side weaving edge. If the standing-plate-side voltage exceeds 100% relative to the arc voltage value at the welding-line center position, the undercut prevention effect is less likely to be exhibited.

If the bottom-plate-side voltage falls below 100% relative to the arc voltage value at the welding-line center position, the overlap prevention effect is less likely to be exhibited. If the bottom-plate-side voltage exceeds 125% relative to the arc voltage value at the welding-line center position, the arc length becomes excessive, possibly resulting in insufficient weld penetration or insufficient arc.

Practical Examples

Next, practical examples of the present invention will be described in comparison with comparative examples that deviate from the scope of the present invention. The practical examples and the comparative examples provide the grounds for, for example, the limitations of the numerical values mentioned above.

First, the welding conditions applied when performing welding in the practical examples and the comparative examples will be described. It should be noted that the welding conditions to be described below are merely examples and are not to be limited to the following welding conditions in this embodiment.

The target leg length is set to 6 mm, the welding current is set to 400 amperes (the unit of electric current: A), and the average arc voltage corresponding to the welding current of the electrode is set in the range between 33 volts (the unit of voltage: V) and 35 V inclusive. The arc voltage is changed linearly in accordance with the weaving trajectory of the electrode. The welding rate, which is the rate when the welding torch 11 operates, is set to 50 cm/min, and the weaving frequency is set to 2.5 Hz. Furthermore, the weaving width (i.e., the distance from the bottom-plate-side weaving edge to the standing-plate-side weaving edge) is set to 3 mm.

The welding wire used is a soft-steel solid wire and has a diameter of 1.2 mm. The standing plate and the bottom plate used are a general-purpose rolled steel material (SS400) having a thickness of 12 mm. The shield gas used is Ar-20% $CO_2$.

Next, test results obtained in the practical examples and the comparative examples will be described. FIG. 10 illustrates various kinds of conditions in the practical examples. FIG. 11 illustrates various kinds of conditions in the comparative examples. In the example shown in FIG. 10, No. 1 to No. 29 are indicated as the practical examples. In the example shown in FIG. 11, No. 30 to No. 50 are indicated as the comparative examples.

The "torch tilt angle θ" indicates, for example, the torch tilt angle θ formed between, for example, the bottom plate and the electrode in FIG. 2. Tests are performed in the range between 25 degrees and 70 degrees inclusive in the practical examples and at 45 degrees in the comparative examples.

The "leading and trailing angles" indicate the leading angle γ1 and the trailing angle γ2 in FIGS. 6A and 6B. For example, a negative value such as "−15" implies that the trailing angle is set to 15 degrees. In the practical examples, the range is set between −30 degrees and 45 degrees inclusive, that is, between a trailing angle of 30 degrees and a leading angle of 45 degrees. In the comparative examples, the angle is set to 0 degrees.

The "standing-plate-side movement angle α" indicates the standing-plate-side movement angle α in FIG. 4. In the practical examples, the range is set between 5 degrees and 85 degrees inclusive. In the comparative examples, the range is set between 85 degrees and 180 degrees inclusive.

The "bottom-plate-side movement angle β" indicates the bottom-plate-side movement angle β in FIG. 4. In the practical examples, the range is set between 185 degrees and 250 degrees inclusive. In the comparative examples, the range is set between 250 degrees and 355 degrees inclusive.

The "arc voltage $V_O$" indicates an arc voltage value at the welding-line center position. The "arc voltage $V_{Lower}$" indicates an arc voltage value at the bottom-plate-side weaving edge (i.e., a bottom-plate-side voltage value). Moreover, the ratio of the arc voltage $V_{Lower}$ to the arc voltage $V_O$ (arc voltage $V_{Lower}$/arc voltage $V_O$) is indicated in percentage. The "arc voltage $V_{Upper}$" indicates an arc voltage value at the standing-plate-side weaving edge (i.e., a standing-plate-side voltage value). Moreover, the ratio of the arc voltage $V_{Upper}$ to the arc voltage $V_O$ (arc voltage $V_{Upper}$/arc voltage $V_O$) is indicated in percentage. In the practical examples and the comparative examples, tests are performed with respect to these average arc voltages in the range between 33 V and 35 V inclusive, as described above.

FIG. 12 illustrates test results obtained in the practical examples. FIG. 13 illustrates test results obtained in the comparative examples. In the example shown in FIG. 12, the test results shown correspond to test Nos. 1 to 29 shown in FIG. 10. In the example shown in FIG. 13, the test results shown correspond to test Nos. 30 to 50 shown in FIG. 11. As evaluation results, the status after the welding process is evaluated based on four items, namely, a "leg length" item, a "flank angle" item, a "bead appearance" item, and a "welding defect" item.

The "leg length" item indicates a result obtained by performing an evaluation based on the ratio between the standing-plate-side leg length and the bottom-plate-side leg length (i.e., standing-plate-side leg length/bottom-plate-side leg length, also referred to as "leg length ratio" hereinafter). A leg length is measured from a macroscopic cross section, and the closer the leg length ratio is toward 1, the more uniform the bead shape is with respect to the standing plate and the bottom plate. Therefore, a fair evaluation result denoted by a circle is obtained when the leg length ratio ranges between 0.85 and 1.15 inclusive, and a poor evaluation result denoted by "X" is obtained otherwise. Furthermore, a satisfactory evaluation result denoted by a double circle is obtained when the leg length ratio ranges between 0.95 and 1.05 inclusive.

Figure 14:
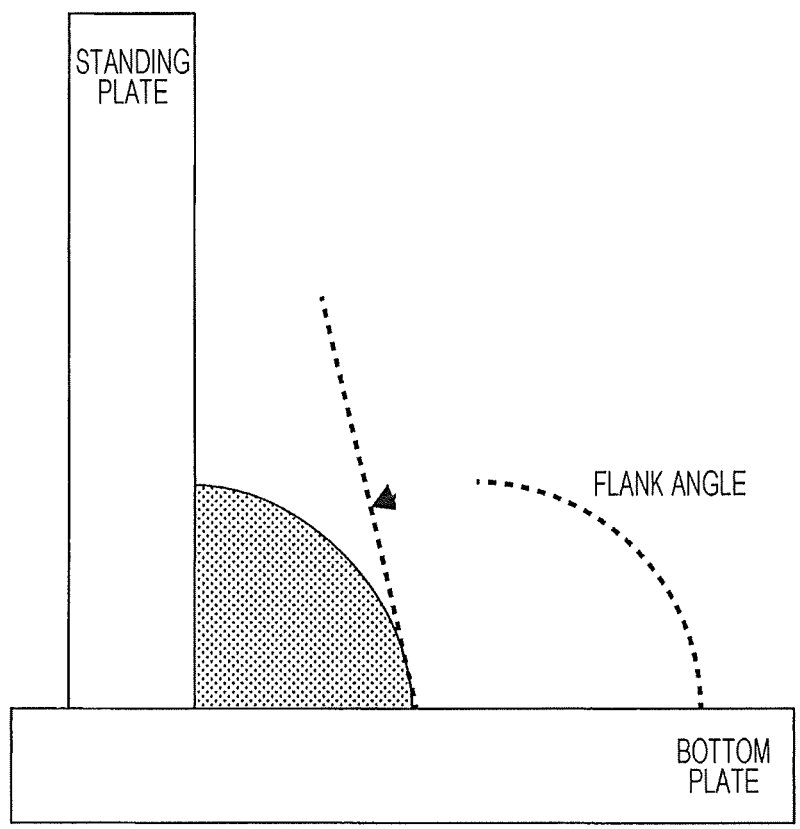
FIG. 14 is a diagram for explaining a flank angle.

The "flank angle" item indicates a result obtained by performing an evaluation based on the flank angle, which is one of indicators for evaluating the shape of a weld toe (i.e., a portion where the surface of a base material and the surface of a weld bead meet). FIG. 14 is a diagram for explaining the flank angle. As shown in the drawing, the flank angle is an angle at which a bead rises from a weld toe. In the practical examples, the flank angle at the bottom plate side is measured and evaluated. Normally, a smooth and satisfactory bead shape is obtained as the flank angle increases. Therefore, since an overlap occurs when the flank angle falls below 90 degrees, and the throat thickness (i.e., the thickness of the molten metal in cross section) becomes insufficient when the flank angle exceeds 150 degrees, a poor evaluation result denoted by "X" is obtained. When the flank angle is between 90 degrees and 150 degrees inclusive, a fair evaluation result denoted by a circle is obtained. Furthermore, when the flank angle is between 110 degrees and 135 degrees inclusive, it is determined that a more favorable toe shape is obtained so that a satisfactory evaluation result denoted by a double circle is obtained.

The "bead appearance" item indicates a result, obtained by the tester visually checking the bead after the welding process. A fair evaluation result, denoted by a circle is obtained when the appearance is normal. In contrast, if a meandering bead in which the bead meanders or a humping bead (i.e., an uneven bead with continuous bumps) occurs or if there is excessive spatter adhesion in the surrounding area, it is determined that the bead shape is inferior and a poor evaluation result denoted by "X" is obtained.

The "welding defect" item indicates a result obtained by the tester visually checking the bead and observing the macroscopic cross section thereof after the welding process. If the occurrence of a welding defect, such as an undercut, an overlap, or incomplete fusion, is confirmed as a result of a bead appearance check or macroscopic cross-section observation, a poor evaluation result denoted by "X" is obtained. If no welding defect has occurred, a fair evaluation result denoted by a circle is obtained.

In each of the practical examples No. 1 to No. 29, the "standing-plate-side movement angle α" and the "bottom-plate-side movement angle β" are within the appropriate ranges, and a favorable bead shape with a good leg length ratio and a good flank angle but with no welding defects is obtained. Specifically, the evaluation results for No. 1 to No. 29 are all satisfactory and are given a circle or a double circle with respect to the four evaluation items, namely, the "leg length" item, the "flank angle" item, the "bead appearance" item, and the "welding defect" item.

In particular, in Nos. 6, 7, 10 to 13, and 16 to 19, the arc voltage $V_{Lower}$ is higher than the arc voltage $V_{Upper}$, arc voltage $V_{Lower}$/arc voltage $V_O$ ranges between 100% and 125% inclusive, and arc voltage $V_{Upper}$/arc voltage $V_O$ ranges between 85% and 100% inclusive. As a result, the flank angle is within a more appropriate range so that a satisfactory evaluation result denoted by a double circle is obtained.

In Nos. 2 and 10 to 15, the "standing-plate-side movement angle α" is in a more preferable range between 10 degrees and 45 degrees inclusive, and the "bottom-plate-side movement angle β" is in a more preferable range between 185 degrees and 215 degrees inclusive. As a result, the leg length ratio is an optimal value so that a satisfactory evaluation result denoted by a double circle is obtained.

In Nos. 22 and 23, the "torch tilt angle θ" is 30 degrees and 60 degrees, respectively, and is within a more preferable range between 30 degrees and 60 degrees inclusive. In Nos. 24 and 25, the torch tilt angle θ is 25 degrees and 70 degrees, respectively, and deviates from the more preferable range between 30 degrees and 60 degrees inclusive. As a result, a satisfactory evaluation result denoted by a double circle is obtained with respect to the "leg length" item in Nos. 22 and 23, but a fair valuation result denoted by a circle is obtained with respect to the "leg length" item in Nos. 24 and 25.

In Nos. 26 and 28, the "leading and trailing angles" are −15 degrees and 30 degrees, respectively, and are within a more preferable range between −15 degrees and 40 degrees inclusive. In Nos. 27 and 29, the "leading and trailing angles" are −30 degrees and 45 degrees, respectively, and deviate from the more preferable range between −15 degrees and 40 degrees inclusive. As a result, a satisfactory evaluation result denoted by a double circle is obtained with respect to the "flank angle" item in Nos. 26 and 28, but a fair valuation result denoted by a circle is obtained with respect to the "flank angle" item in Nos. 27 and 29.

In each of the comparative examples Nos. 30 to 50, the "standing-plate-side movement angle α" and the "bottom-plate-side movement angle β" deviate from the appropriate ranges, and a poor evaluation result denoted by "X" is obtained with respect to at least one of the four evaluation items, namely, the "leg length" item, the "flank angle" item, the "bead appearance" item, and the "welding defect" item (i.e., inferior bead appearance in the case of the "bead appearance" item and a welding defect in the case of the "welding defect" item), so that an unfavorable result is obtained.

No. 30 indicates a result obtained in a case where a normal weaving operation is performed. A normal weaving operation refers to the conventional weaving operation as shown in FIGS. 16 and 17. In this case, the standing-plate-side movement angle α ranges between, for example, 90 degrees and 180 degrees inclusive, and the bottom-plate-side movement angle β ranges between, for example, 180 degrees and 270 degrees inclusive. As the result of No. 30, dripping of the molten metal at the standing plate side, a nonuniform leg length, and an overlap have occurred.

Nos. 31 to 34 each indicate a result obtained when a weaving operation that involves moving the electrode ahead toward the standing plate is performed, that is, when the electrode is moved forward in the welding travel direction to the standing-plate-side weaving edge and is then moved rearward against the welding travel direction to the bottom-plate-side weaving edge. As a result, the arc becomes unstable due to dripping of the molten pool at the standing plate side and fluctuations in the shape of the molten pool, resulting in the occurrence of excessive spatter and incomplete fusion.

Nos. 35 to 42 each indicate a result obtained when voltage control is performed during a normal weaving operation. In Nos. 35 and 36, the bottom-plate-side voltage is lower than the standing-plate-side voltage, and an overlap has occurred. In No. 37, the bottom-plate-side voltage is higher than the standing-plate-side voltage, but a nonuniform leg length has occurred due to dripping of the molten metal at the standing plate side. In No. 38, the bottom-plate-side voltage is also higher than the standing-plate-side voltage, but an undercut has occurred. In Nos. 39 and 40, the bottom-plate-side voltage is higher than the standing-plate-side voltage, but a nonuniform leg length has occurred due to dripping of the molten metal at the standing plate side, and an overlap has occurred. In Nos. 41 and 42, the standing-plate-side voltage is higher than the bottom-plate-side voltage, a nonuniform leg length has occurred due to dripping of the molten metal at the standing plate side, and an undercut has occurred.

Nos. 43 to 50 each indicate a result obtained by performing voltage control during a weaving operation that involves moving the electrode ahead toward the standing plate. In any case, the arc becomes unstable due to dripping of the molten pool at the standing plate side and fluctuations in the shape of the molten pool, resulting in the occurrence of excessive spatter and incomplete fusion.

Accordingly, by adjusting the standing-plate-side movement angle α, the bottom-plate-side movement angle β, the torch tilt angle θ, the leading angle γ1 (trailing angle γ2), and the arc voltage, a favorable bead shape with a good leg length ratio and a good flank angle but with no welding defects is obtained, whereby a satisfactory result or a more satisfactory result is obtained.

<Hardware Configuration of Robot Controller>

Figure 15:
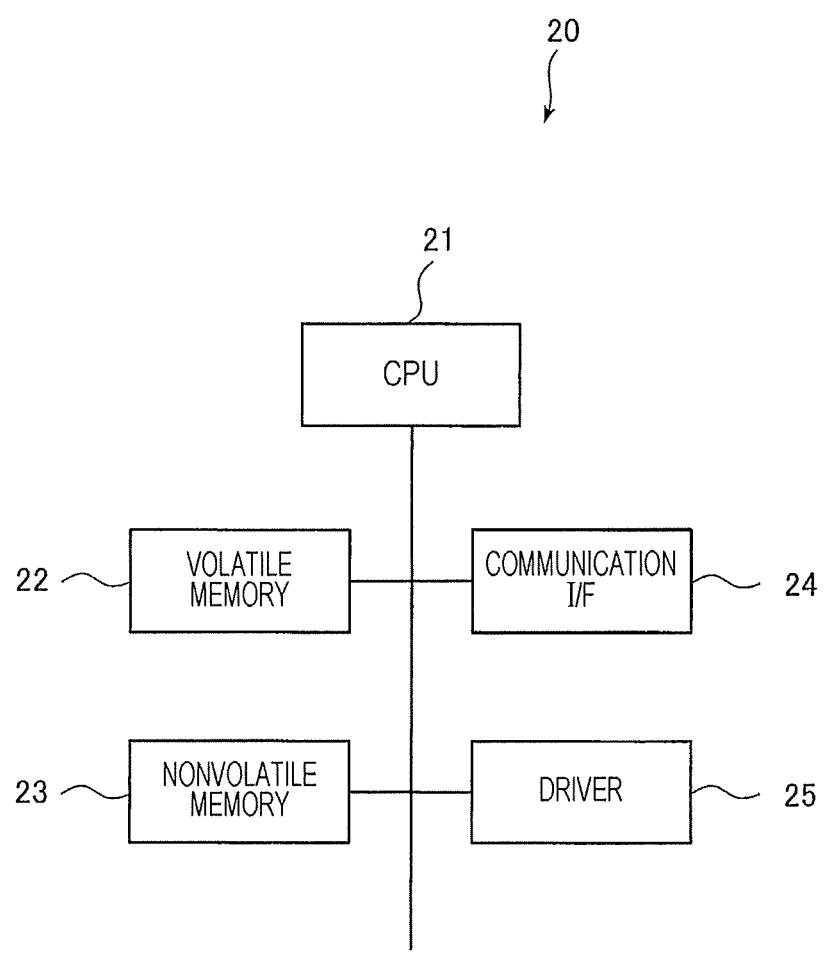
FIG. 15 illustrates a hardware configuration example of a robot controller.

Lastly, the hardware configuration of the robot controller 20 will be described. FIG. 15 illustrates a hardware configuration example of the robot controller 20.

As shown in FIG. 15, the robot controller 20 includes a CPU 21 as arithmetic means, and also includes a volatile memory 22 and a nonvolatile memory 23 as storage regions. The CPU 21 executes various types of programs, such as an OS (operating system) and application software, so as to realize the functions of the robot controller 20. The volatile memory 22 is a storage region that stores, for example, various types of programs and data used for executing the programs. The nonvolatile memory 23 is a storage region that stores, for example, data input to the various types of programs and data output from the various types of programs.

The robot controller 20 further includes a communication interface (referred to as "communication I/F" hereinafter) 24 for communicating with an external unit and a driver 25 for reading and writing data from and to a storage medium.

For example, the CPU 21 executes the various types of programs, such as the OS and the application software, so as to realize the functions of the robot controller 20, whereby the electrode weaving operation and the arc-voltage control described above are performed.

It should be noted that the hardware configuration in FIG. 15 is merely an example and the robot controller 20 is not limited to the shown configuration. A program that realizes the embodiment of the present invention may be provided by being distributed in a stored state in a magnetic disk, an optical disk, a semiconductor memory, or other types of storage media or by being distributed via a network.

As described above, when the electrode provided at the distal end of the welding torch 11 is caused to perform a weaving operation, the welding system 1 according to this embodiment moves the electrode forward in the welding travel direction to the bottom-plate-side weaving edge and moves the electrode rearward against the welding travel direction to the standing-plate-side weaving edge. With this configuration, for example, the occurrence of inferior bead appearance and welding defects is suppressed, as compared with the conventional weaving operation in which the electrode constantly oscillates forward in the welding travel direction.

Although the present invention has been described with reference to the embodiment, the technical scope of the present invention is not limited to the above embodiment. It is obvious to a person skilled in the art that various modifications and alternatives may be employed so long as they do not depart from the spirit and scope of the present invention.

The present, application is based on Japanese Patent Application (No. 2015-093671) filed Apr. 30, 2015, the contents of which are incorporated herein by reference.

REFERENCE SIGNS LIST 1 welding system 10 welding robot 11 welding torch 20 robot controller 30 welding power supply 40 feeding device α standing-plate-side movement angle β bottom-plate-side movement angle θ torch tilt angle γ1 leading angle of electrode γ2 trailing angle of electrode

The invention claimed is:

1. A horizontal fillet welding method comprising:
performing welding along a welding line by using a junction at which a standing plate and a bottom plate meet as the welding line and causing an electrode to perform a weaving operation with reference to the welding line as a center, wherein the weaving operation includes moving the electrode forward in a welding travel direction to a bottom-plate-side weaving edge and moving the electrode rearward against the welding travel direction to a standing-plate-side weaving edge when the electrode reaches the bottom-plate-side weaving edge, the weaving operation being repeated at the bottom plate side and the standing plate side, the weaving operating including tilting the electrode to make a torch tilt angle at which the electrode is tilted relative to the bottom plate larger at the bottom-plate-side weaving edge than at the standing-plate-side weaving edge,
wherein an arc voltage at the standing-plate-side weaving edge is controlled in a range of 85% or more and less than 100% relative to an arc voltage at the welding line center position, and an arc voltage at the bottom-plate-side weaving edge is controlled in a range of more than 100% and 125% or less relative to the arc voltage value at the welding line center position, and when the electrode moves at the standing plate side and the bottom plate side, the arc voltage changes in synchronization with the weaving operation in a linear manner.

2. The horizontal fillet welding method according to claim 1, wherein when the electrode is moved forward in the welding travel direction to the bottom-plate-side weaving edge in the weaving operation, a bottom-plate-side movement angle β (degrees), which is an angle formed between a trajectory of the electrode and an opposite direction from the welding travel direction, is between 185 degrees and 250 degrees inclusive, wherein when the electrode is moved rearward against the welding travel direction to the standing-plate-side weaving edge, a standing-plate-side movement angle α (degrees), which is an angle formed between the trajectory of the electrode and the opposite direction from the welding travel direction, is between 5 degrees and 85 degrees inclusive, and wherein the standing-plate-side movement angle α and the bottom-plate-side movement angle β have a relationship α>(β−180).

3. The horizontal fillet welding method according to claim 2, wherein the standing-plate-side movement angle α is between 10 degrees and 45 degrees inclusive and the bottom-plate-side movement angle β is between 185 degrees and 215 degrees inclusive in the weaving operation.

4. The horizontal fillet welding method according to claim 1, wherein the torch tilt angle at which the electrode is tilted relative to the bottom plate is between 30 degrees and 60 degrees inclusive from the bottom plate, wherein an upper limit for a leading angle at which the electrode is tilted toward an opposite side from the welding travel direction is 40 degrees, and wherein an upper limit for a trailing angle at which the electrode is tilted in the welding travel direction is 15 degrees.

5. The horizontal fillet welding method according to claim 2, wherein the torch tilt angle at which the electrode is tilted relative to the bottom plate is between 30 degrees and 60 degrees inclusive from the bottom plate, wherein an upper limit for a leading angle at which the electrode is tilted toward an opposite side from the welding travel direction is 40 degrees, and wherein an upper limit for a trailing angle at which the electrode is tilted in the welding travel direction is 15 degrees.

6. The horizontal fillet welding method according to claim 3, wherein the torch tilt angle at which the electrode is tilted relative to the bottom plate is between 30 degrees and 60 degrees inclusive from the bottom plate, wherein an upper limit for a leading angle at which the electrode is tilted toward an opposite side from the welding travel direction is 40 degrees, and wherein an upper limit for a trailing angle at which the electrode is tilted in the welding travel direction is 15 degrees.

7. The horizontal fillet welding method according to claim 1, wherein the arc voltage at the standing-plate-side weaving edge is set to a voltage that suppresses an undercut, and wherein the arc voltage at the bottom-plate-side weaving edge is set to a voltage that suppresses an overlap.

8. A horizontal fillet welding system comprising:
an electrode that performs welding along a welding line by using a junction at which a standing plate and a bottom plate meet as the welding line and causing the electrode to perform a weaving operation with reference to the welding line as a center, wherein the weaving operation includes moving the electrode forward in a welding travel direction to a bottom-plate-side weaving edge and moving the electrode rearward against the welding travel direction to a standing-plateside weaving edge when the electrode reaches the bottom-plate-side weaving edge, the weaving operation being repeated at the bottom plate side and the standing plate side, the weaving operating including tilting the electrode to make a torch tilt angle at which the electrode is tilted relative to the bottom plate larger at the bottom-plate-side weaving edge than at the standing-plate-side weaving edge, wherein an arc voltage at the standing-plate-side weaving edge is controlled in a range of 85% or more and less than 100% relative to an arc voltage at the welding line center position, and an arc voltage at the bottom-plate-side weaving edge is controlled in a range of more than 100% and 125% or less relative to the arc voltage value at the welding line center position, and when the electrode moves at the standing plate side and the bottom plate side, the arc voltage changes in synchronization with the weaving operation in a linear manner.

9. A non-transitory computer-readable medium storing a program used in a horizontal fillet welding system that performs welding along a welding line by using a junction at which a standing plate and a bottom plate meet as the welding line and causing an electrode to perform a weaving operation with reference to the welding line as a center, the program, when executed by a computer, causes the horizontal fillet welding system to perform the weaving operation including moving the electrode forward in a welding travel direction to a bottom-plate-side weaving edge and moving the electrode rearward against the welding travel direction to a standing-plate-side weaving edge when the electrode reaches the bottom-plate-side weaving edge, the weaving operation being repeated at the bottom plate side and the standing plate side, the weaving operating including tilting the electrode to make a torch tilt angle at which the electrode is tilted relative to the bottom plate larger at the bottom-plate-side weaving edge than at the standing-plate-side weaving edge, wherein an arc voltage at the standing-plate-side weaving edge is controlled in a range of 85% or more and less than 100% relative to an arc voltage at the welding line center position, and an arc voltage at the bottom-plate-side weaving edge is controlled in a range of more than 100% and 125% or less relative to the arc voltage value at the welding line center position, and when the electrode moves at the standing plate side and the bottom plate side, the arc voltage changes in synchronization with the weaving operation in a linear manner.

\* \* \* \* \*